United States Patent
Richard et al.

(10) Patent No.: US 7,416,319 B2
(45) Date of Patent: Aug. 26, 2008

(54) ILLUMINATION DEVICE FOR VANITY MIRRORS OF MOTOR VEHICLES SUN VISORS

(75) Inventors: Stéphane Richard, Vagney (FR); Vincent Bernard, Anould (FR)

(73) Assignee: Grupo Antolin-Ingeniera, S.A., Burgos (ES)

( * ) Notice: Subject to any disclaimer, the term of this patent is extended or adjusted under 35 U.S.C. 154(b) by 221 days.

(21) Appl. No.: 11/353,333

(22) Filed: Feb. 14, 2006

(65) Prior Publication Data
US 2007/0258256 A1  Nov. 8, 2007

(30) Foreign Application Priority Data
Feb. 14, 2005  (EP) .................................. 05381005

(51) Int. Cl.
*B60Q 1/00* (2006.01)
(52) U.S. Cl. .................. 362/492; 362/135; 362/142; 200/551; 296/97.1
(58) Field of Classification Search .............. 362/492, 362/135, 137, 141, 144, 154, 156, 142; 296/97.1, 296/97.6, 1.11; 200/551, 533, 535
See application file for complete search history.

(56) References Cited
U.S. PATENT DOCUMENTS

| | | | | |
|---|---|---|---|---|
| 4,174,864 A | * | 11/1979 | Viertel et al. ............... 296/97.5 |
| 4,791,537 A | * | 12/1988 | Fisher et al. ................. 362/135 |
| 5,054,839 A | * | 10/1991 | White et al. ................ 296/97.1 |
| 5,205,639 A | * | 4/1993 | White et al. ................. 362/137 |
| 5,331,518 A | * | 7/1994 | Roark et al. ................. 362/492 |
| 5,430,624 A | * | 7/1995 | Yoshida et al. .............. 362/492 |
| 6,076,947 A | * | 6/2000 | Miller ........................ 362/492 |
| 6,135,610 A | * | 10/2000 | Beck et al. .................. 362/142 |
| 7,258,470 B2 | * | 8/2007 | Ogawa ........................ 362/492 |

FOREIGN PATENT DOCUMENTS

| | | |
|---|---|---|
| DE | 19521748 | 12/1996 |
| WO | WO03095253 | 11/2003 |
| WO | WO2004039616 | 5/2004 |

* cited by examiner

*Primary Examiner*—Sandra L. O'Shea
*Assistant Examiner*—Gunyoung T. Lee
(74) *Attorney, Agent, or Firm*—Collard & Roe, P.C.

(57) ABSTRACT

The present invention relates to an illumination device for vanity mirrors of motor vehicle sun visors. The illumination device does not use cables as conducting elements nor external mechanical elements such as switches, simplifying the assembly operations. A conducting laminar element performs all of these functions: in addition to being the conducting means it acts as a switch for the device. This device is actuated by a cover that covers the mirror and is operated at the user's will. The device is characterised in that it is only illuminated in one position, in which the cover is not covering the mirror and the visor is in a shading position.

6 Claims, 4 Drawing Sheets

ILLUMINATION DEVICE FOR VANITY MIRRORS OF MOTOR VEHICLES SUN VISORS

OBJECT OF THE INVENTION

The present invention relates to an illumination device for vanity mirrors of motor vehicle sun visors.

The illumination device is characterised by not using cables to conduct electricity, nor any external mechanical elements such as switches, simplifying the operation of mounting the device on the sun visor. A conducting flexible laminar element performs all of the aforementioned function: in addition to being the conduction medium it acts as a switch for the device.

The device is actuated by a cover over the mirror, operated at the user's will. The device is characterised by illuminating only in one position, in which the cover is displaced and the sun visor is in its shading position.

BACKGROUND OF THE INVENTION

Illumination devices for vanity mirrors typically incorporated in motor vehicle sun visors are well known.

The sun visor mirror is usually covered by a slidable or tiltable cover operated at the user's will. It is common for the cover to act on the illumination device so that it opens or closes the electric circuit by acting on the corresponding switch to turn on or off the light meant to illuminate the mirror.

One of the drawbacks of these devices is that the conducting elements are cables that do not follow straight paths from the car supply to the mirror, complicating its layout and assembly. In this path there are moving parts that can lead to fatigue of the conducting element and eventual breakage.

In addition, these circuits require additional mechanical elements such as switches. Another common problem is connecting cables to the switches, which is generally by welding. These operations must be performed by suitably skilled workers; these are delicate unions that often lose reliability, so that the contact is lost and the circuit remains open.

According to the above, the operations for mounting the illumination device in the sun visor must be performed manually, increasing the cost of the final product and the mounting times.

One example is patent DE19521748, which relates to a sun visor with a vanity mirror and an incorporated illumination device. The solution proposed in this document to illuminate the mirror uses a flexible conducting element that opens or closes an electric circuit that uses cables, with the resulting drawbacks: attachment of the cables to the sun visor body and complicated assembly in these small spaces.

Patent WO2004039616 also relates to a sun visor with a vanity mirror and illumination device. In this case the electric circuit uses cables and external mechanical elements as switches. As it requires additional elements such as switches, the mounting tasks are complicated and slowed down, resulting in an increased cost of the final product.

Patent WO03/095253 proposes another solution for a sun visor with an illumination device. In this case the movement of the sun visor body or the movement of an articulated arm activate or deactivate the illumination device. The articulated arm comprises two metallic conducting elements one of them constantly in contact with an end of an electric conductor element, due to a permanent strength, and the other metallic element can take contact with a second end of the electric conductor element and in this way activate the illumination device.

This solution doesn't use a laminar element that swivels about any pin or interact together with the sun visor body and a mirror cover as it is explained in the present invention.

The present invention solves the problems mentioned before. An illumination device is obtained that eliminates conducting cables and switches, therefore eliminating the problems resulting from the delicate unions between these elements. A single element integrates the functions performed by the conducting cables and the switch, thereby simplifying the mounting operations.

DESCRIPTION OF THE INVENTION

The present invention consists of an illumination device for vanity mirrors of motor vehicle sun visors that is actuated by a cover that covers the mirror.

Illumination devices for these vanity mirrors generally comprise cables as means for conducting the electrical power and a switch as an external mechanical element that opens or closes the circuit actuated by a cover. It is necessary to join these elements manually, usually by welding, which complicates and increases the cost of the mounting operation.

The present invention unites the conducting element and switch functions in a flexible plate. By eliminating the cables and the switch the delicate unions between them are also eliminated, simplifying the mounting operations.

The illumination device described in the present invention consists of a conducting flexible laminar element that also performs the device switch functions. This laminar element has an open-loop configuration that can adopt two different positions when it is actuated by the cover that covers the sun visor mirror.

The laminar element is attached to the bottom of the sun visor body by attachment means and on the top a pin also attached to the sun visor body allows the top part of the laminar element to swivel when it is actuated by the cover and adopt the two positions mentioned above.

Another element of the device is a sun visor shaft about which the sun visor can turn and which connects it to the motor vehicle body. This sun visor shaft has a circular groove and two circular tracks made of a conducting material, these last two ones, meant to make contact with the laminar element disposed in the sun visor to close the electric circuit and illuminate the mirror.

The joint action of the conducting laminar element, the mirror cover, the attachment means, the upper pin, the groove in the visor shaft and the conducting tracks allow the illumination device to be turned on only in a position corresponding to the sun visor in its shading position and the mirror cover revealing the mirror. This is the only position in which the electrical circuit is closed; it is the position in which the conducting laminar element makes contact with the two conducting tracks of the sun visor shaft, thereby closing the electric circuit.

Another three positions are possible: sun visor in shading position and cover covering the mirror, sun visor in storage position and cover covering the mirror, sun visor in storage position and cover revealing the mirror; in any of these three positions the illumination device is off as the electrical circuit is open due to a special configuration of the laminar element and the sun visor shaft.

DESCRIPTION OF THE DRAWINGS

The present descriptive memory is completed by a set of drawings that illustrate the example of a preferred embodiment and are not meant to limit the invention in any way.

DETAILED DESCRIPTION OF THE INVENTION

The present invention relates to an illumination device for a vanity mirror (1.1) of those usually provided in sun visors (1) of motor vehicles, as shown in all the figures included in the document.

Figure 1:
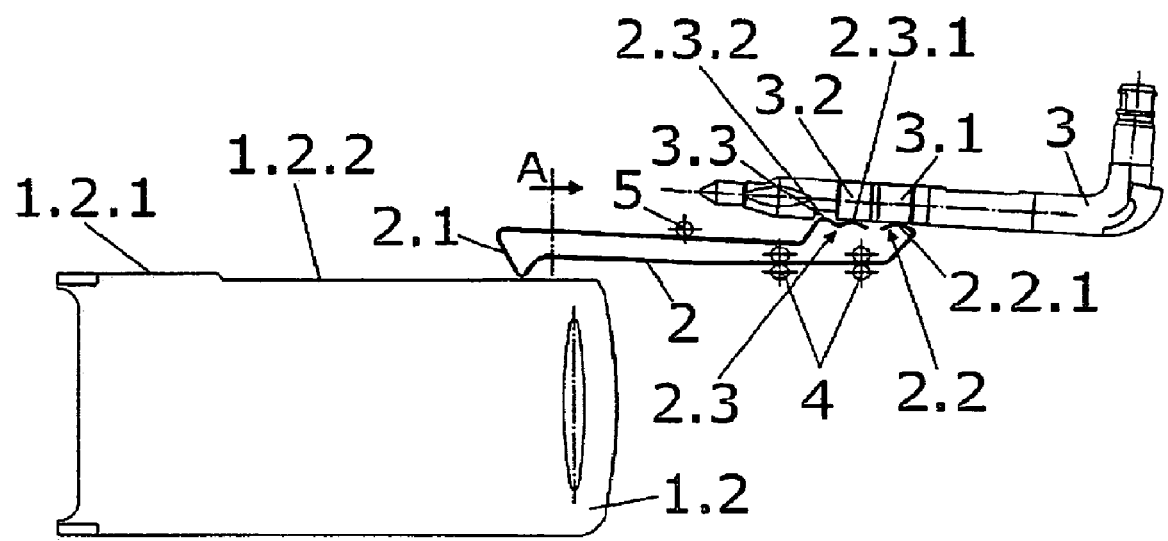
FIG. 1 and FIG. 2 show a perspective view and front schematic representation of the illumination device and the sun visor in the position in which the device is turned on, this is, with the sun visor in a shading position and the cover revealing the mirror. The perspective view represents a section of the sun visor that shows the elements comprising the invention.
Figure 2:
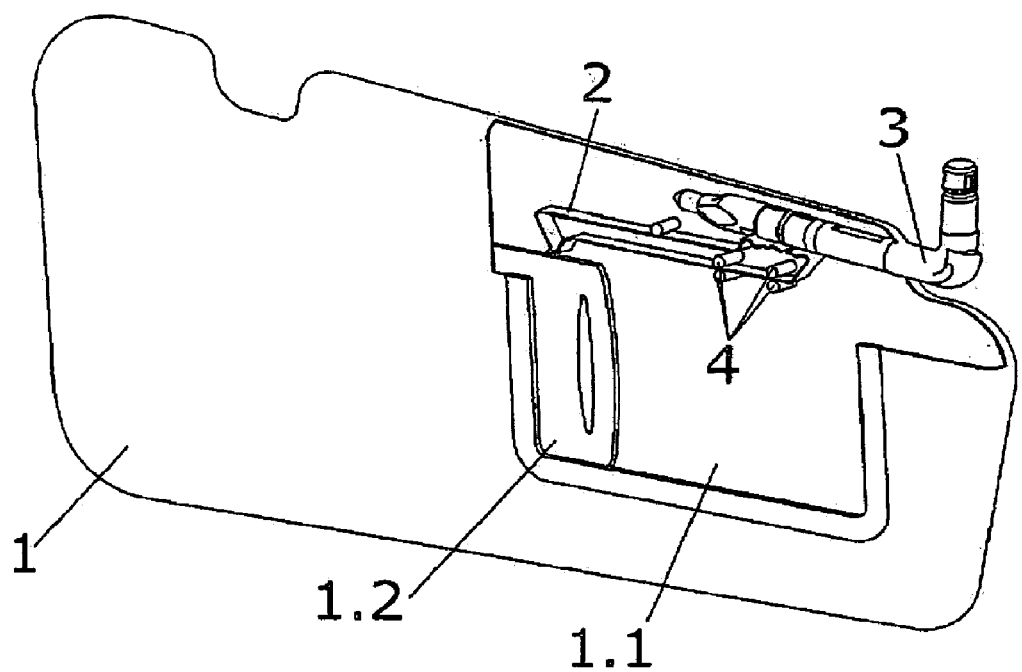

FIG. 1 and FIG. 2 show the sun visor (1) in a shading position and the mirror (1.1), protected by a sliding cover (1.2), uncovered. This position, with the visor (1) in a shading position and the cover (1.2) displaced, is the only one in which the illumination device is turned on, as it is the only one in which the electric circuit is closed.

The device consists of a flexible conducting laminar element (2) with an open-loop configuration. In the examples shown, the laminar element (2) has an essentially rectangular shape and is open on the top at one of its ends.

At one of its ends (2.1), as shown in all of the figures, the laminar element (2) inferiorly touches the top part of the cover (1.2) covering the mirror (1.1) and superiorly, on the end diagonally opposite the aforementioned end (2.1), touches a rotation shaft (3) of the sun visor. This rotation shaft (3) that connects the sun visor (1) to the motor vehicle roof is the shaft (3) about which the sun visor (1) can turn to adopt its two extreme positions: storage (essentially parallel to the vehicle roof) and shading position (to protect the user from an undesired external illumination).

The laminar element (2) is attached to the body of the visor (1) by pins (4, 5). In the example shown in the figures there are two pairs of attachment pins (4) that embrace the laminar element (2) on its inferior side at the half opposite the end (2.1) that touches the cover and another upper pin (5) placed above the top side, and on its middle part, of the conducting laminar element (2). This pin (5) establishes a support point that allows the free upper segment to swivel.

The free upper segment is understood as the segment labelled in FIG. 1 with an "A" and an arrow indicating that this segment corresponds the overhanging segment from the upper elbow to the open end.

The lower end (2.1) of the laminar element (2) that touches the cover (1.2) has a finger (2.1) with which it touches the top side of the mirror cover (1.2).

A ledge of the top part of the cover (1.2) makes this cover (1.2) have two different levels (1.2.1, 1.2.2) separated by the ledge on which rests the finger (2.1) of the laminar element (2). These two levels (1.2.1, 1.2.2) with the upper pin (5) and the flexibility of the laminar element (2), allow the free upper segment to adopt two positions as described below.

When the mirror cover (1.2) is moved to cover or reveal the mirror, the finger (2.1) of the laminar element touches the top side of the cover (1.2), at the upper level (1.2.1) or bottom level (1.2.2) respectively, so that the free upper segment of the laminar element (2) swivels about the upper pin (5). In this way, if the cover (1.2) moves from a position in which the mirror (1.1) is covered to one in which the mirror (1.1) is uncovered, the open end (2.3) of the free upper segment rises slightly from its initial position. This end (2.3) will be referred to hereinafter as the second end.

The top part of the laminar element (2) is open on the end diagonally opposite the finger (2.1) that touches the cover (1.2) to create the free swivelling segment. The outermost open end (2.2) (hereinafter referred to as the first end) corresponding to the upper non-swivelling end of the laminar element (2), is provided with a first gentle bump (2.2.1) that is always in contact with a first conducting track (3.1) placed about the rotation shaft (3) of the visor. The second end (2.3) of the laminar element (2) has two bumps: a second gentle bump (2.3.1) meant to contact a second conducting track (3.2), also placed about the rotation shaft (3) of the visor, and a larger bump (2.3.2) which we will call the safety bump.

The electric circuit will only be closed when the safety bump (2.3.2) enters a groove (3.3) of the sun visor rotation shaft (3); in this position the second bump (2.3.1) can contact the second conducting track (3.2), closing the circuit.

Therefore, the visor rotation shaft (3) has two conducting tracks (3.1, 3.2); the first one is always in contact with the first gentle bump (2.2.1) of the laminar element (2), while the second conducting track (3.2) is meant to contact the second gentle bump (2.3.1) to close the electric circuit. The latter contact only takes place when the safety bump (2.3.2) enters the groove (3.3) made in the visor shaft (3).

In the examples shown in all the figures, the conducting tracks (3.1, 3.2) cover about 270[deg.]; it is not necessary for the tracks (3.1, 3.2) to be continuous as the visor (1) does not rotate 360[deg.]. The tracks (3.1, 3.2) could nonetheless be continuous and cover a full circle, or even cover a smaller angle than that shown in the figure. For a correct operation of the device, it is enough that when the safety bump (2.3.2) enters the groove (3.3) the other two bumps (2.3.1, 2.2.1) are in contact with the conducting tracks (3.1, 3.2).

The angle covered by the groove (3.3) in the shaft (3) must be such that it is only opposite the safety bump (2.3.2) when the visor (1) is in its shading position.

In the different positions represented by the figures of this document, the cover (1.2) slides to cover or reveal the mirror (1.1) and the finger (2.1) of the laminar element (2) moves along the upper side of the mirror cover (1.2) until it reaches its final position. In this path the finger (2.1) of the laminar element can pass from the upper level (1.2.1) to the lower level (1.2.2) of the cover (1.2) (if it is covering the mirror), or vice versa if it is uncovering the mirror (1.1). In any case, this movement bends the bottom part of the laminar element (2) thanks to its flexibility and the pining of the free upper segment of the laminar element (2) about the upper pin (5).

FIG. 1 and FIG. 2 show the position in which the illumination device is on. This position corresponds to the sun visor (1) in a shading position and the cover (1.2) revealing the mirror (1.1). In this position, the lower protruding end (2.1) of the conducting laminar element (2) contacts the lower level (1.2.2) of the top side of the cover (1.2) and the second end (2.3) rises to a position in which the second gentle bump (2.3.1) touches the visor rotation shaft (3). In this position, corresponding to the deployment of the visor (1), the groove (3.3) is opposite the safety bump (2.3.2) allowing it to enter the groove (3.3) and close the electric circuit as the second gentle bump (2.3.1) makes contact with the second conducting track (3.2).

Figure 3:
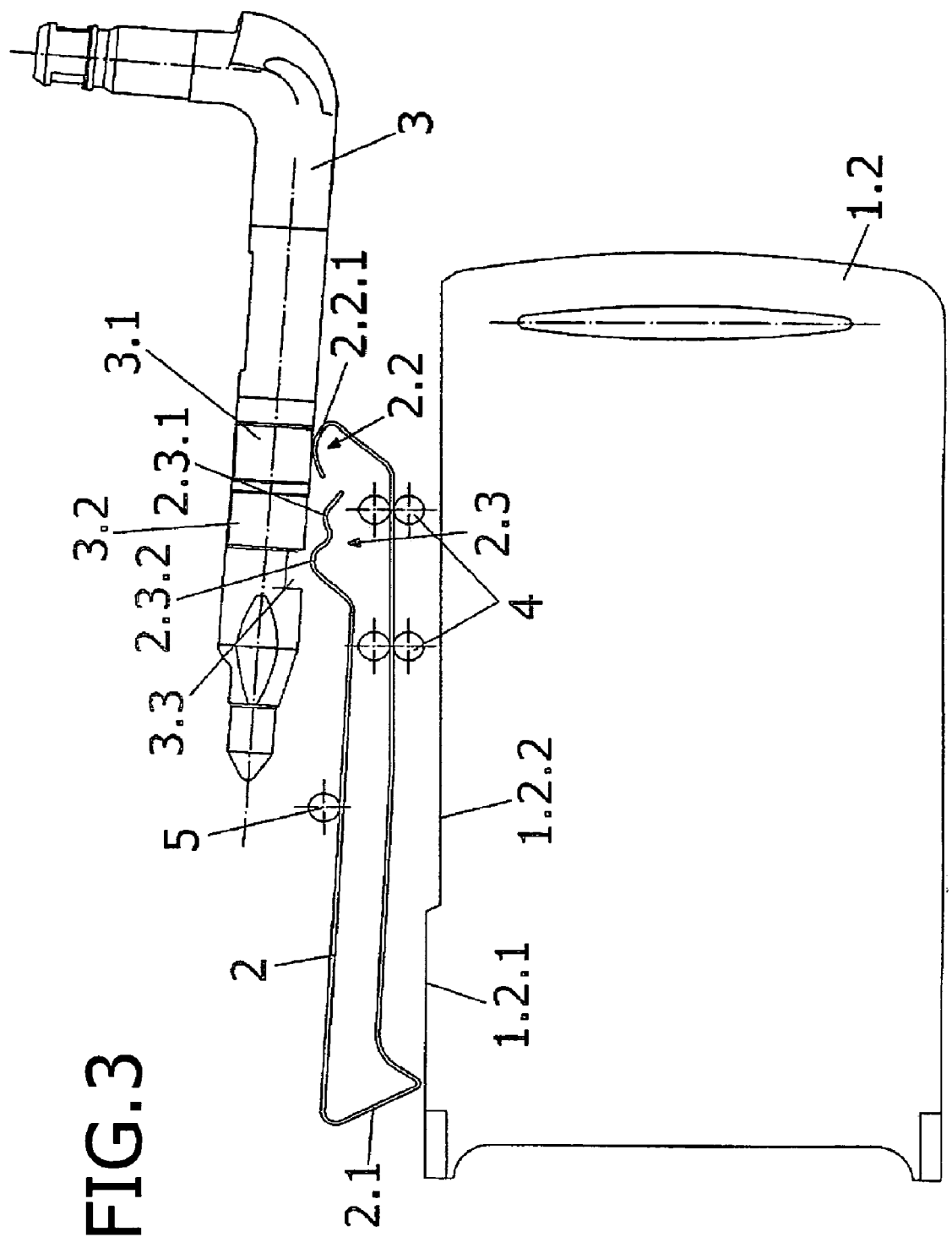
FIG. 3 is a front view of the illumination device together with the visor, where the sun visor is in a shading position and the cover covers the mirror.

FIG. 3 corresponds to the sun visor (1) in a shading position and the mirror cover (1.2) covering the mirror (1.1). In this position the finger (2.1) of the laminar element contacts the upper level (1.2.1) of the mirror cover (1.2) and the second end (2.3) is left in a lower position where neither the second gentle (2.3.1) nor the safety bump (2.3.2) touch the visor rotation shaft (3). The circuit is open and the illumination device is off.

Figure 4:
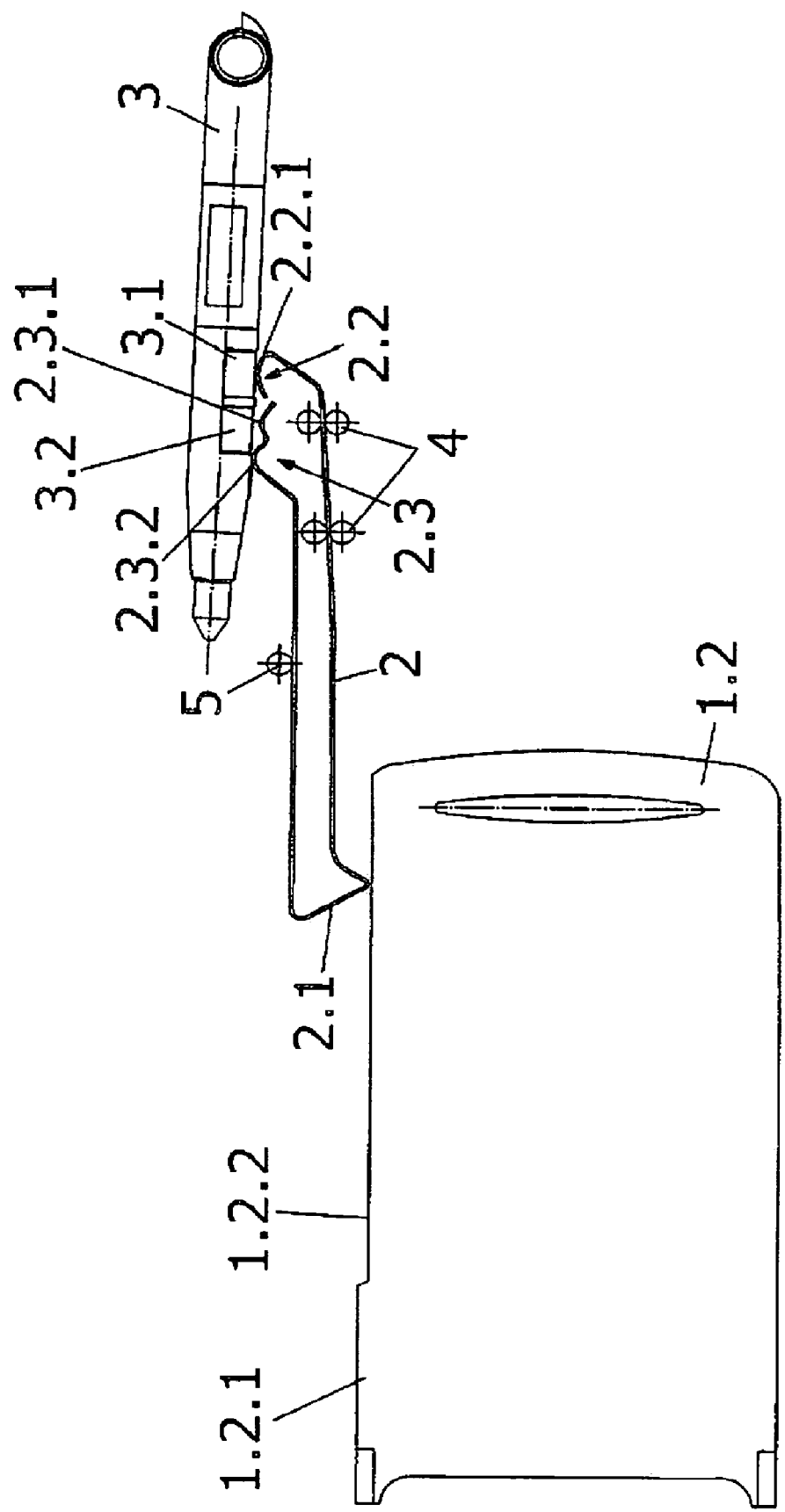
FIG. 4 is a schematic plan view of the illumination device together with the sun visor in the position in which the sun visor is in a storage position and the cover reveals the mirror.
Figure 5:
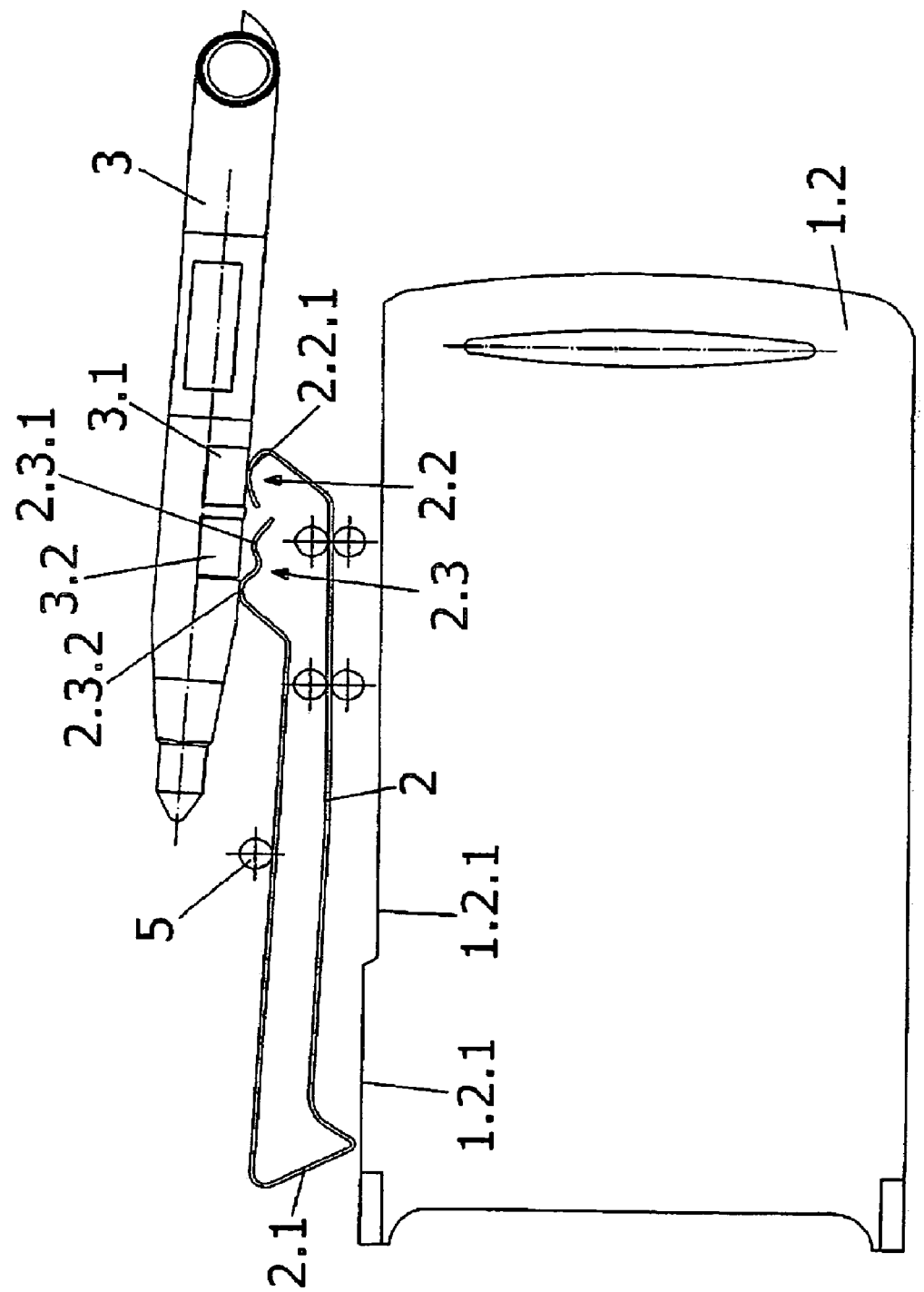
FIG. 5 is a schematic plan view of the illumination device together with the sun visor in the position in which the sun visor is in a storage position and the cover covers the mirror.

FIGS. 4 and 5 correspond to the position in which the sun visor (1) is storage. In FIG. 4, the cover (1.2) reveals the mirror (1.1) while in FIG. 5 the cover (1.2) covers the mirror (1.1).

In these positions, the circuit is always open: the groove (3.3) of the rotation shaft (3) is not opposite the safety bump (2.3.2).

FIG. 4 shows that the safety bump (2.3.2) rests directly on the shaft (3) and does not enter the groove (3.3), which is concealed, thereby preventing the contact of the second gentle bump (2.3.1) with the second conducting track (3.2). This is thus a safety position in which the device is off when the visor (1) is storage even if the cover (1.2) is not covering the mirror (1.1).

In FIG. 5, corresponding to the sun visor (1) in a storage position and the cover (1.2) covering the mirror (1.1), the groove (3.3) is also concealed. In addition, the second end (2.3) is in its lower position.

The essence of this invention is not affected by variations in the materials, shape, size and arrangement of its component elements, described in a non-limiting manner that should allow its reproduction by an expert in the field.

The invention claimed is:

1. An illumination device for vanity mirrors of motor vehicle sun visors actuated by a sliding cover that covers the mirror at a user's will, the illumination device comprising:
    a) a rotation shaft about which the sun visor turns to be in a shading position or a storage position, said rotation shaft connecting the sun visor to a vehicle body, said rotation shaft comprising a first conducting track and a second conducting track;
    b) a flexible conducting laminar element comprising:
        i) a loop configuration having an open part on a top; said open part of said loop configuration having a first end constantly in contact with said first conducting track and a second end for contacting said second conducting track to close an electric circuit; and
        ii) a finger on a lower end of said flexible conducting laminar element that always contacts one of two levels of a stepped upper level of the sliding cover that covers the mirror;
    c) an attachment means for attaching said flexible conducting laminar element on a lower side, on a half opposite said finger, to the sun visor; and
    d) a support pin disposed on a top of said flexible conducting laminar element and attached to the sun visor, said support pin allowing an upper free end of said flexible conducting laminar element to swivel when the sliding cover is moved, provoking or not a contact between said second end of said flexible conducting laminar element and said second conducting track of said rotation shaft.

2. The illumination device for vanity mirrors of motor vehicle sun visors according to claim 1, wherein said flexible conducting laminar element comprises an essentially rectangular shape.

3. The illumination device for vanity mirrors of motor vehicle sun visors according to claim 1, wherein said first end of said flexible conducting laminar element that is constantly in contact with said first conducting track of said rotation shaft comprises a first gentle bump that is in constant contact with said first conducting track.

4. The illumination device for vanity mirrors of motor vehicle sun visors according to claim 1, wherein said second end of said flexible conducting laminar element, which can contact said second conducting track of said rotation shaft, comprises a second gentle bump that can contact said second conducting track.

5. The illumination device for vanity mirrors of motor vehicle sun visors according to claim 1, wherein said second end of said flexible conducting laminar element comprises a larger safety bump that rests on said rotation the shaft.

6. The illumination device for vanity mirrors of motor vehicle sun visors according to claim 5, wherein said rotation shaft comprises a groove that is placed opposite said safety bump only when the sun visor is in a shading position and wherein said safety bump is allowed to enter said groove when the mirror is not covered by the sliding cover.

* * * * *